United States Patent [19]

Fannar

[11] Patent Number: 5,752,318
[45] Date of Patent: May 19, 1998

[54] HYDRODYNAMIC BEARING AND METHOD

[75] Inventor: Heimir Fannar, Mooresville, N.C.

[73] Assignee: Ingersoll-Rand Company, Woodcliff Lake, N.J.

[21] Appl. No.: 568,331

[22] Filed: Dec. 6, 1995

[51] Int. Cl.$^6$ ............................................. F16C 33/00
[52] U.S. Cl. ................... 29/898.02; 451/51; 264/162; 264/296; 29/898.055; 29/527.3; 29/557; 29/898.056
[58] Field of Search ..................... 384/118; 264/162, 264/294, 296, 320; 451/61, 51; 29/898.02, 898.055, 898.056, 557, 527.3

[56] References Cited

U.S. PATENT DOCUMENTS

| | | | |
|---|---|---|---|
| 2,397,626 | 10/1946 | Shriver, Jr. | 29/898.055 |
| 3,104,136 | 9/1963 | Merriman | 29/898.055 |
| 4,496,251 | 1/1985 | Ide | 384/117 |
| 4,636,095 | 1/1987 | Gerling | 384/117 |
| 4,927,275 | 5/1990 | Lawson | 384/117 |
| 5,007,745 | 4/1991 | Ball et al. | 384/307 |
| 5,033,871 | 7/1991 | Ide | 384/98 |
| 5,193,915 | 3/1993 | Leidenfrost | 384/118 |
| 5,218,764 | 6/1993 | Suzuki | 29/898.066 |
| 5,281,032 | 1/1994 | Slocum | 384/118 |
| 5,372,431 | 12/1994 | Ide | 384/122 |
| 5,427,455 | 6/1995 | Bosley | 384/106 |
| 5,593,231 | 1/1997 | Ippolito | 29/898.02 |

FOREIGN PATENT DOCUMENTS

| | | | |
|---|---|---|---|
| 0146720 | 11/1981 | Japan | 264/162 |
| 0958089 | 9/1982 | U.S.S.R. | 264/162 |

*Primary Examiner*—Larry I. Schwartz
*Assistant Examiner*—Marc W. Butler
*Attorney, Agent, or Firm*—Michael M. Gnibus

[57] ABSTRACT

A hydrodynamic radial bearing including a cylindrical body having an inner wall and an outer wall, at least one gutter along the inner wall and at least one wedge-shaped recess in fluid receiving communication with the at last one gutter. The at least one wedge has a wide portion immediately adjacent the gutter and a narrow portion located away from the wide portion along the circumference of the inner wall.

The bearing is manufactured by inserting the bearing into a fixture having at least one deforming protuberance located along an interior wall of the fixture so that the at least one protuberance contacts the outer wall of the bearing and elastically deforms the inner wall of the bearing. Then a machining operation is performed along the inner wall to remove the deformed portion of the inner wall. The bearing is then removed from the fixture and the machined portion of the wall retracts, forming at least one recess.

12 Claims, 5 Drawing Sheets

HYDRODYNAMIC BEARING AND METHOD

FIELD OF THE INVENTION

This invention generally relates to a hydrodynamic bearing and method of manufacturing a hydrodynamic bearing. More particularly, the invention relates to a hydrodynamic radial bearing having at least one fluid conveying gutter and at least one wedge-shaped recess in fluid receiving communication with the at least one gutter where the at least one wedge-shaped recess is formed by elastically deforming a bearing preform to form at least one wedge-shaped deformation along a wall of the preform, machinably removing the at least one wedge-shaped deformation, and releasing the bearing from elastic deformation.

DESCRIPTION OF THE PRIOR ART

Hydrodynamic bearings utilize bearing geometry to create a fluid wedge which provides a fluid film for supporting rotation of a shaft or a like rotating member. In order to maintain the fluid film during operation of the shaft or the like, the film must have a thickness that converges in the direction of shaft rotation so that the film is substantially wedge-shaped.

Conventional hydrodynamic bearings create the wedge-shaped fluid film by deflecting or moving a portion of a load carrying bearing pad. Such conventional bearings are referred to in the art as offset bearings and floating bearings.

Generally, in an offset bearing, the hydrodynamic bearing includes a load carrying pad and a support below the pad that is made integral with the pad. The support is made integral with the pad at a position that is offset from the pad central axis. In this way, the pad deflects under the fluid film pressure to produce a wedge-shaped film during rotation of the shaft. In floating bearings, the pad is permitted to float and deflect in the required direction to produce the required fluid wedge. Both of the aforementioned hydrodynamic bearings can produce suitable wedge-shaped fluid films however, the bearings are expensive to manufacture.

Currently there is an interest among those skilled in the art to replace conventional oil lubricated bearings or grease-packed bearings with hydrodynamic bearings. However to date, use of hydrodynamic bearings has been limited since the bearings are quite expensive relative to the cost of other conventional bearings.

The foregoing illustrates limitations known to exist in present devices and methods. Thus, it is apparent that it would be advantageous to provide an alternative method for manufacturing hydrodynamic bearings directed to overcoming one or more of the limitations set forth above. Accordingly, a suitable alternative is provided including features more fully disclosed hereinafter.

SUMMARY OF THE INVENTION

In one aspect of the present invention, this is accomplished by providing a hydrodynamic bearing that includes a cylindrical body having an inner wall and an outer wall, at least one gutter along the inner wall and at least one wedge-shaped recess in fluid receiving communication with the at last one gutter. The at least one wedge has a wide portion immediately adjacent the gutter and a narrow portion located away from the wide portion along the circumference of the inner wall.

In another aspect of the invention, the bearing is manufactured by inserting the bearing into a fixture having at least one deforming protuberance located along an interior wall of the fixture so that the at least one protuberance contacts the outer wall of the bearing and elastically deforms the inner wall of the bearing. Then a machining operation is performed along the inner wall to remove the deformed portion of the inner wall. The bearing is then removed from the fixture and the machined portion of the wall retracts, forming at least one recess. The foregoing and other aspects will become apparent from the following detailed description of the invention when considered in conjunction with the accompanying drawing figures.

BRIEF DESCRIPTION OF THE DRAWING FIGURES

DETAILED DESCRIPTION OF THE PREFERRED EMBODIMENT

Figure 1:
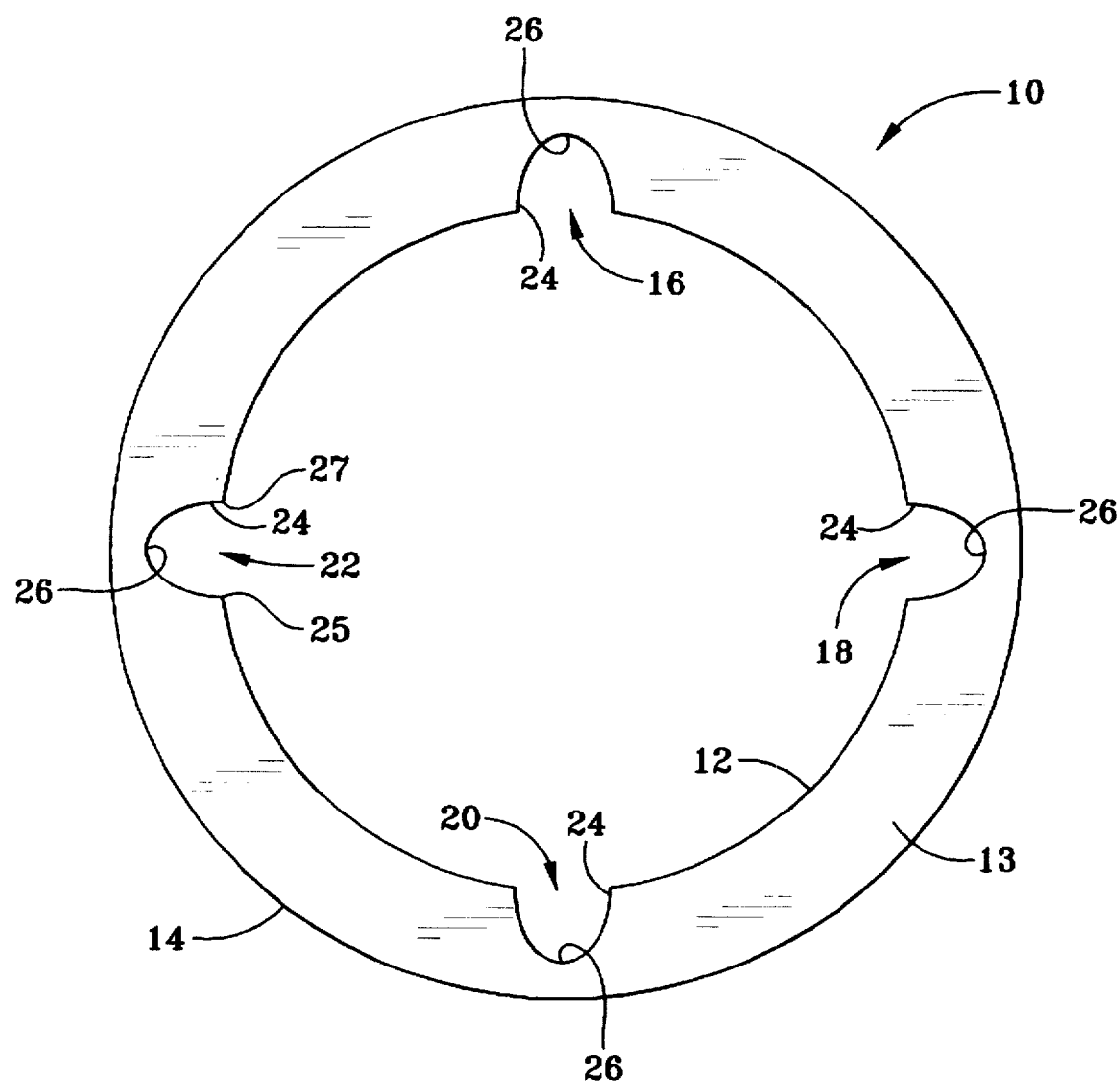
FIG. 1 is a side view of a bearing preform having cylindrical inner and outer surfaces and gutters formed along the inner wall.

Referring now to the drawings, wherein similar reference characters designate corresponding parts throughout the several views, FIG. 1 shows a bearing preform generally indicated at 10. The bearing preform has a hollow body and includes substantially cylindrical inner and outer walls 12 and 14. The bearing preform is made from a conventional thermoplastic or thermoset material. The preferred thermoplastic or thermoset material must be able to deform elastically.

The preform includes four gutters 16, 18, 20, and 22 that are formed along the inner wall 12 of bearing 10. The gutters extend along the height of the preform, substantially perpendicular to face 13. See FIG. 2. As shown in FIG. 1, the gutters are U-shaped and are circumferentially equally spaced, 90 degrees apart along the inner wall. It is contemplated that the gutters may have any suitable shape including but not limited to, an arcuate shape or rectangular shape. Additionally, the gutters can be spaced from the next adjacent gutter by any suitable angle. The gutters permit longitudinal flow of fluid lubricant such as water, through the bearing.

As shown in FIG. 1, the gutters have an open mouth 24 and a closed bottom end 26 located radially outwardly relative to the mouth. The mouth is defined by leading gutter edge 25 and trailing gutter edge 27. The closed gutter end 26 is located proximate the outer wall of the bearing. In the preferred embodiment it is assumed that the bearing is adapted to be used to support a shaft 46 that rotates counterclockwise as indicated by arrow 28.

At least one gutter must be provided in bearing preform 10. The number of gutters provided in the bearing can be adjusted to accommodate the particular application for the hydrodynamic bearing.

Figure 3:
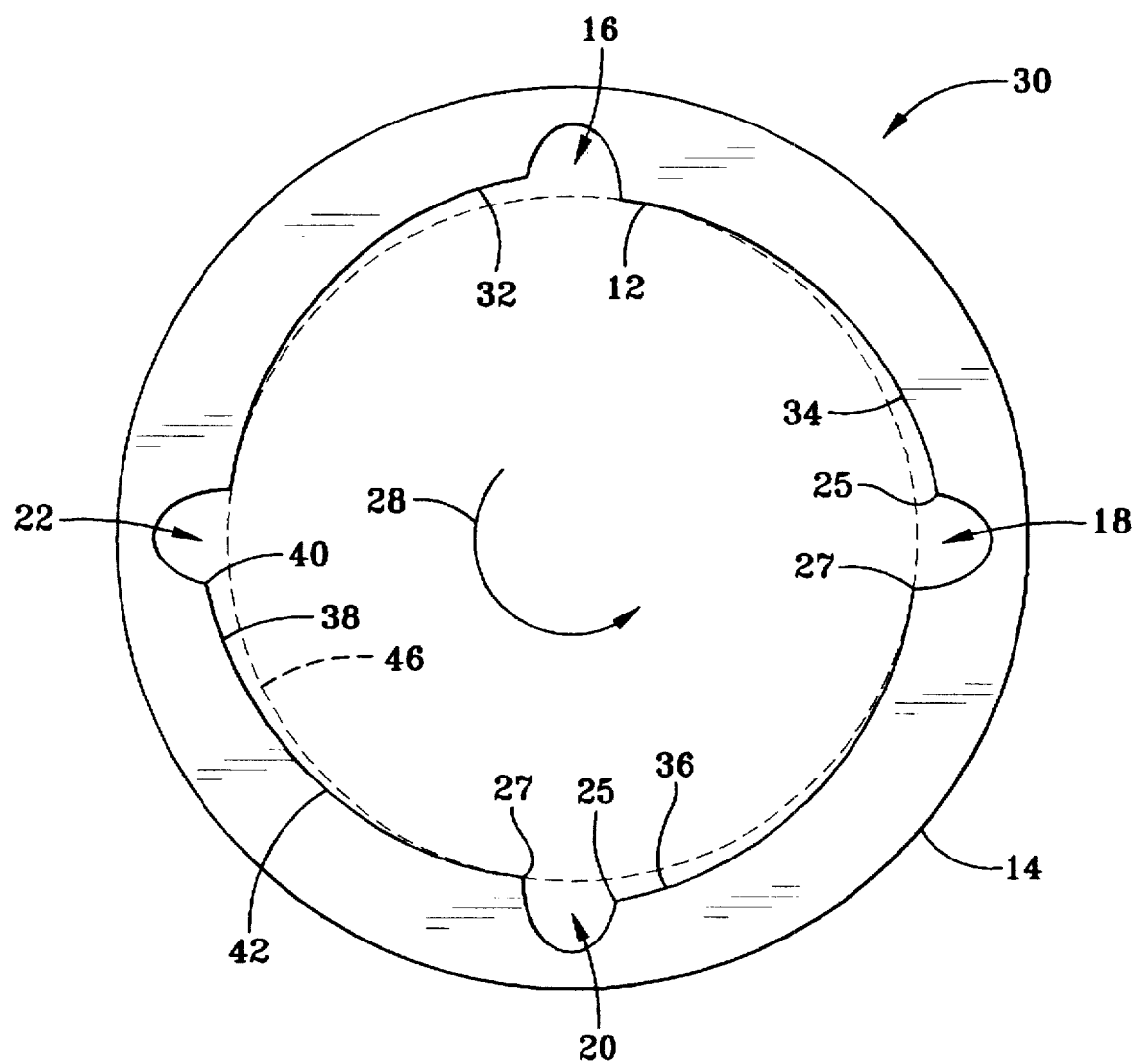
FIG. 3 is the bearing of FIG. 1 further including wedge-shaped recesses formed in the bearing by the method of the present invention.

FIG. 3 discloses radial bearing 30 which is the same as bearing preform 10 except that bearing 30 includes four wedge-shaped recesses 32, 34, 36, and 38 which are formed along the inner wall 12 of the bearing by the method of the current invention. Wedges 32, 34, 36, and 38 are immediately adjacent gutters 16, 18, 20, and 22 respectively, and are in fluid receiving communication with the respective gutter. During rotation of shaft 46, lubricating fluid that is supplied to the gutters is displaced into the recesses and in this way forms the required wedge-shaped fluid film.

As shown in FIG. 3, each of the recesses has a wide end 40 in communication with the gutter at the gutter leading edge 25 and a narrow end 42 located circumferentially away from the wide end in the direction of rotation of shaft 46 supported by the bearing. The recesses 32, 34, 36, and 38 provide a means for the lubricating liquid located in the gutters to be displaced from the gutters into the recesses and in this way form a wedge-shaped fluid film.

Figure 4:
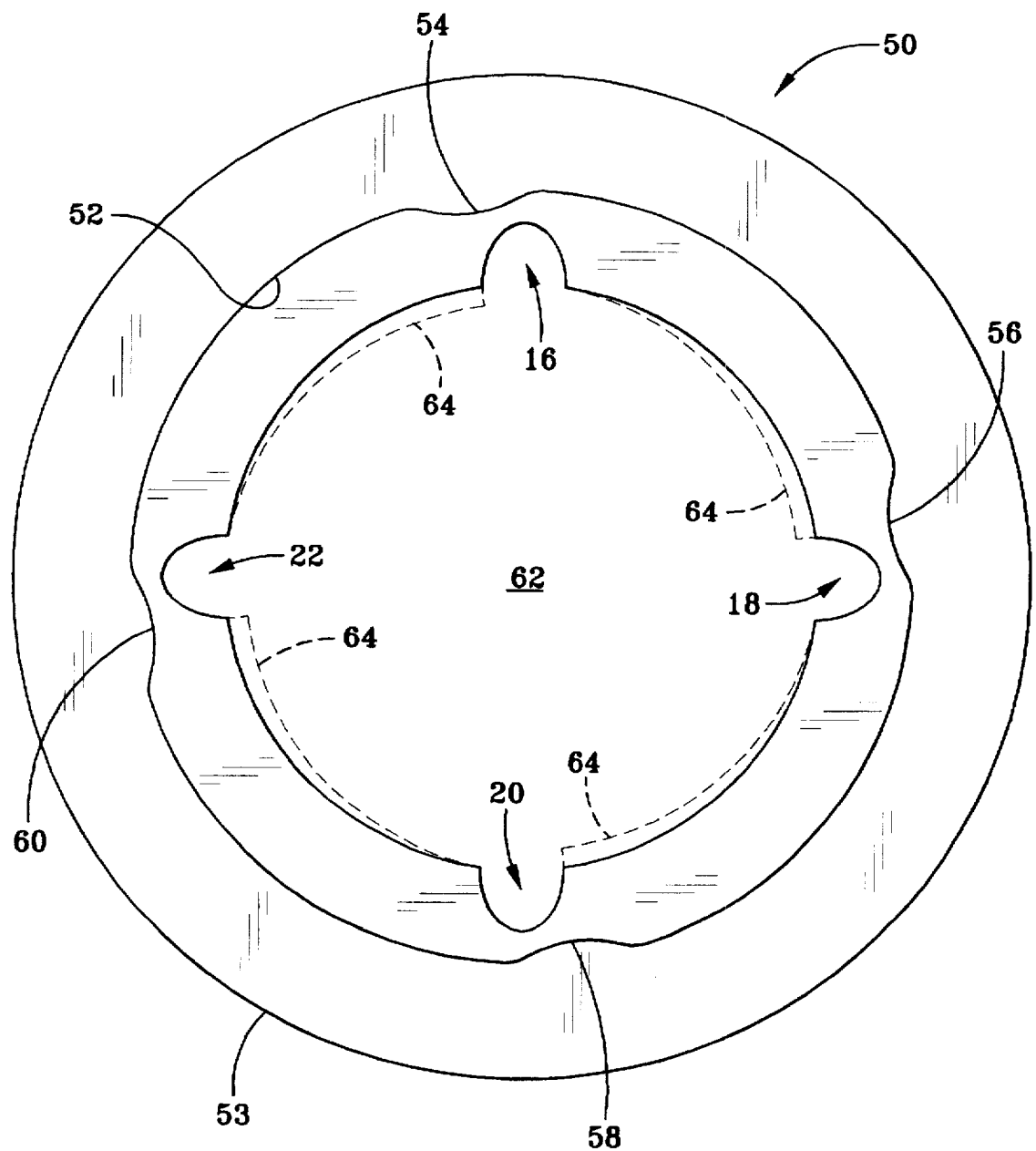
FIG. 4 is a side view of the bearing of FIG. 1, showing the bearing inserted in a manufacturing fixture.

Manufacturing fixture 50, shown in FIG. 4 includes substantially cylindrical inner and outer walls 52 and 53, a chamber 62 defined by inner wall 52. The chamber has a diameter that is larger than the outer diameter of the bearing 10 and is therefore adapted to permit the bearing to be located therein.

The fixture 50 also includes four protuberances 54, 56, 58, and 60 made integral with the inner wall 52 which extend along the height of the fixture. The protuberances extend radially into the chamber 62, and are spaced equidistantly along the inner wall with each protuberance separated from the next adjacent protuberance by ninety degrees. In this way, each protuberance may be located adjacent a respective gutter when the bearing is located in fixture chamber 62 as shown in FIG. 4. Although fixture 50 as disclosed includes four protuberances, the fixture may include any number of protuberances required to manufacture the desired bearing.

Figure 2:
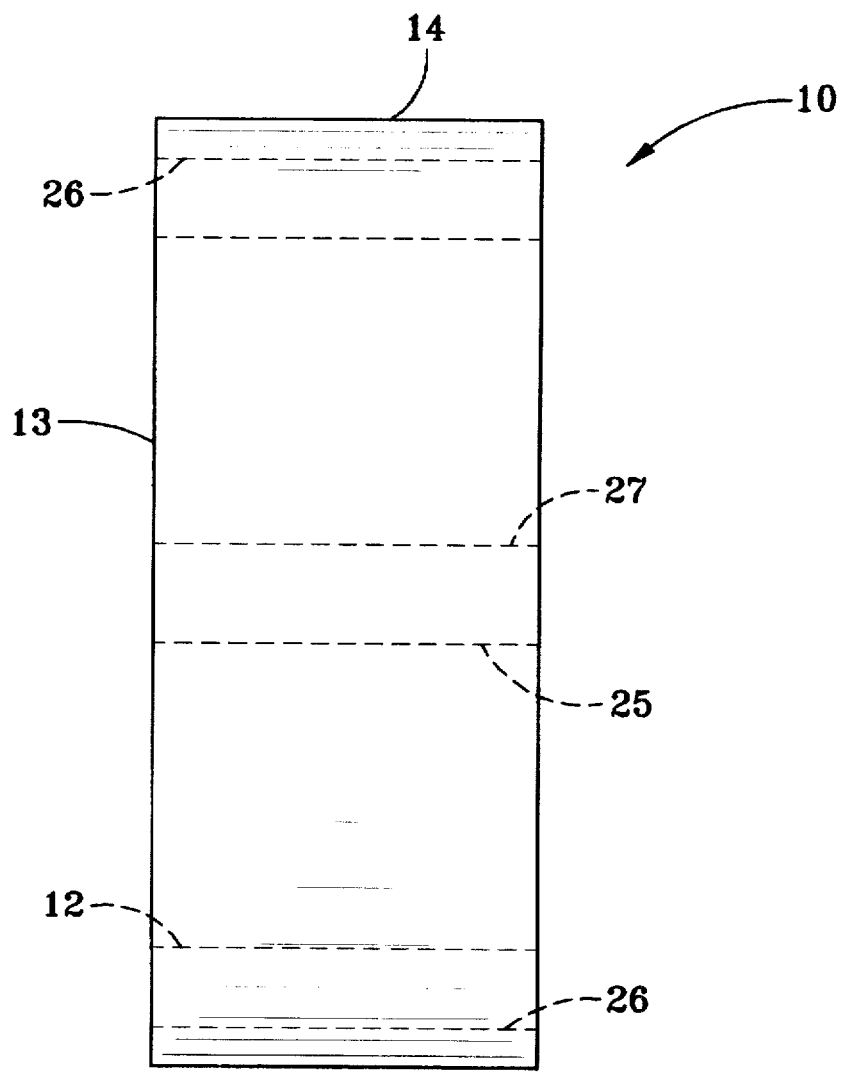
FIG. 2 is a front view of the bearing preform of FIG. 1.

Manufacturing of the bearing 30 will now be described. The bearing preform 10 is formed by a conventional molding process well known to one skilled in the art. Such a molding process may be a compression molding process, an injection molding process, or a gravity pouring process. As shown in FIGS. 1 and 2, the molded bearing preform 10 includes a hollow cylindrical body with gutters 16, 18, 20 and 22 formed along the inner wall 12 of the bearing preform.

After the molded bearing has sufficiently cured, the bearing preform is slid or otherwise located in chamber 62 of fixture 50. As the bearing preform 10 is located in the chamber, the protuberances 54, 56, 58, and 60 contact the outer wall 14 of the bearing adjacent the closed end 26 of gutters 16, 18, 20, and 22 respectively. The contact causes the bearing to deform elastically.

The elastic deformation produces wedge-shaped deformations 64 along the inner wall 12 of the bearing preform 10, as shown in dashed font in FIG. 4. Maximum deformation occurs immediately adjacent the leading edge 25 of the respective gutter and minimum deformation occurs away from the edge 25 along the circumference of the wall 12. The deformations 64 are substantially wedge-shaped and extend inwardly into chamber 62. For purposes of this disclosure the deformations have been enlarged, however the maximum deformation is no more than 0.001 of an inch and the minimum deformation is typically about 2 micrometers.

The wedge-shaped deformations 64 are then machinably removed by a conventional machining process. The machining process may be a grinding operation for example. By removing the deformations, inter wall 12 of the bearing in the fixture 50 is made substantially cylindrical. This machining operation disclosed herein is believed to be simpler, less expensive and likely easier to maintain tolerances than currently used manufacturing methods for hydrodynamic bearings.

After the inner surface 12 has been made substantially cylindrical, the bearing 30 is removed from the fixture 50. In this way, the bearing is relieved of elastic deformation. As the bearing 30 is removed, the portions of the inner surface 12 which were deformed and machined retract radially toward outer surface 14 and thereby form wedge-shaped recesses 34, 36, 38, and 40. Each of the recesses is separated from the next adjacent recess by ninety degrees.

In operation, a shaft 46 is supported by bearing 30. A volume of fluid such as water is flowed from a fluid source (not shown) and is introduced into one end of the gutters. The fluid flows through the gutters and as the shaft rotates is displaced from the gutters and into the wedge-shaped recesses adjacent the shaft to form a fluid wedge and thereby support radial shaft loads.

Figure 5:
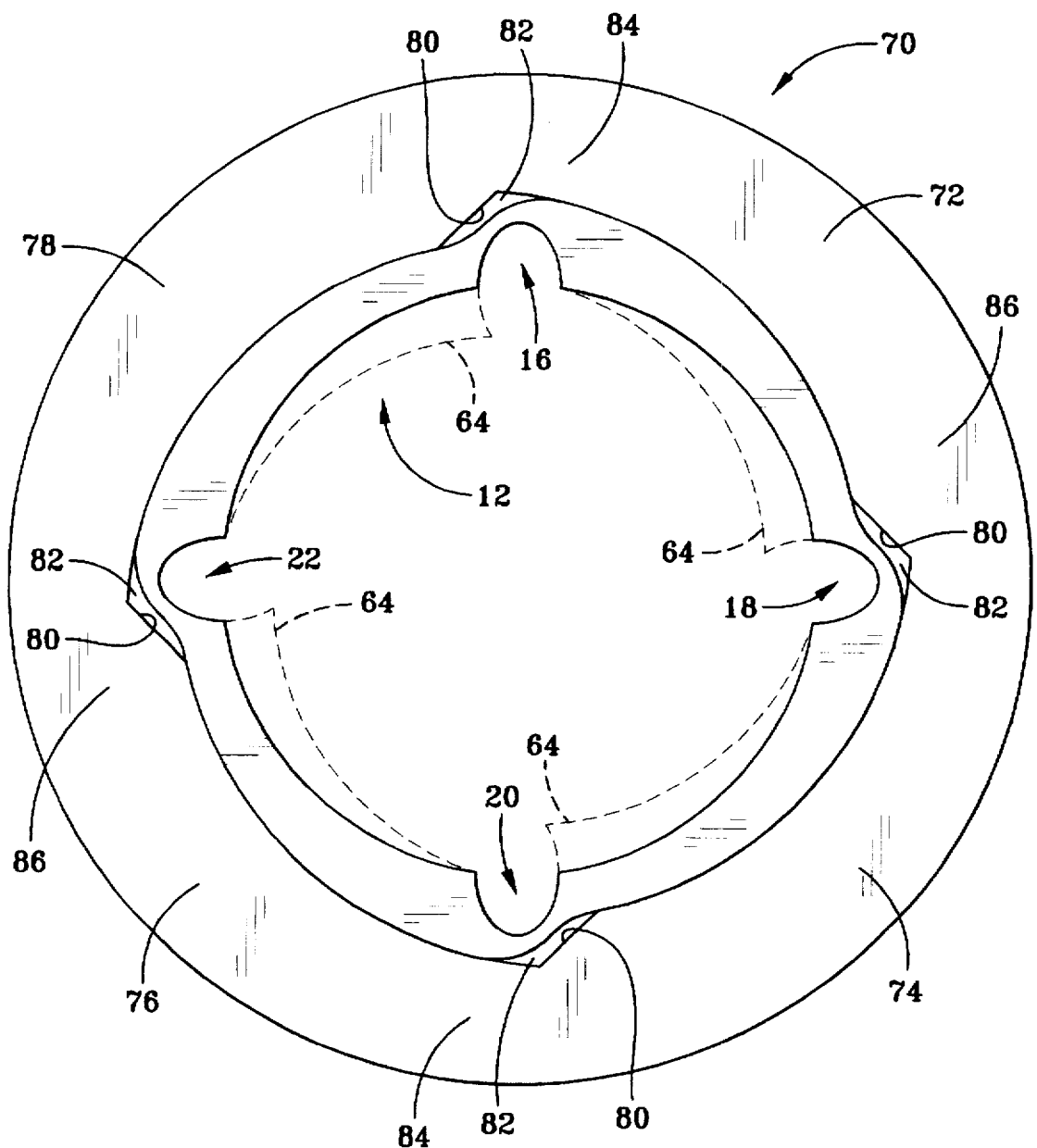
FIG. 5 is a side view of an alternate embodiment of the present invention.

An alternate embodiment of the present invention is shown in FIG. 5. Bearing preform 12 as described hereinabove is located in fixture 70. The bearing preform includes the gutters and deformations as previously described. The preform deformations are shown exaggerated in order to more clearly present the features of the alternate embodiment of the current invention.

Fixture 70 is substantially cylindrical and includes four contact regions 72, 74, 76, and 78. However it is contemplated that fewer or greater than four contact regions may be provided. It is generally required to provide the same number of contact regions as gutters present in the preform. Therefore, fewer or more than four contact regions may be provided in the fixture. Each region is defined along the height of the cylindrical fixture by a wide portion 86 and a narrow portion 84 that is circumferentially spaced from the wide portion. Both the wide and narrow portions extend along the height of the substantially cylindrical fixture 70. As shown in FIG. 5, the radially extending width of the narrow region is less than the width of the wide portion 86.

The narrow region of one contact region is joined to the wide portion of the next adjacent contact region by a transition surface or protuberance 80 which like portions 84 and 86, extends along the height of the fixture.

When the bearing preform is located in the fixture 70, the preform 12 is deformed. The most significant elastic deformation to the bearing preform occurs in the portions of the preform proximate the gutters. The transition surfaces or protuberances 80, produce the deformations 64 in the preform. Additionally, when the preform is deformed, the transition surface 80, narrow portion 84 and adjacent portion of the preform outer wall 14 adjacent the portion 84, define a substantially wedge-shaped recess 82. The portions of the outer wall 14 of the bearing preform 12 immediately adjacent the transition surfaces are separated from direct contact with the fixture transition surfaces by the recesses. In this way, the bearing preform is supported solely by the contact regions 72, 74, 76, and 78 while the preform is located in the fixture, during the machining of deformations 64. In the previously described embodiment of the invention, the outer wall of the preform is wholly in contact with the fixture inner wall 52 in order to support the bearing during manufacturing See FIG. 1. In the present embodiment, the outer wall of the preform is not wholly in contact with the fixture.

After the preform has been inserted in the fixture 70 and deformed in this manner, the resultant hydrodynamic bearing is manufactured in the manner previously described. Elastic deformation is terminated after the preform is machined thereby producing the fluid wedges. Additionally, operation of the resultant bearing in the alternate embodiment is the same as previously described in the previous embodiment of the invention. While we have illustrated and described a preferred embodiment of our invention, it is understood that this is capable of modification, and we therefore do not wish to be limited to the precise details set forth, but desire to avail ourselves of such changes and alterations as fall within the purview of the following claims.

Having described the invention, what is claimed is:

1. A method for manufacturing a hydrodynamic bearing using a bearing preform and a fixture, the bearing preform including a height, an inner wall, an outer wall, a plurality of gutters formed in the inner wall and extending along the bearing height, each gutter having a mouth defined by a leading gutter edge and a trailing gutter edge, the gutters also including a closed end located proximate the outer wall of the bearing; the fixture defining a fixture chamber and comprising a plurality of deforming members extending into the fixture chamber; the method comprising the following steps:

a) elastically deforming the bearing preform having by locating the bearing preform in the fixture chamber so that each of the deforming member contacts the outer wall of the bearing preform adjacent the closed end of a gutter to produce inwardly extending wedge-shaped deformations;

b) making the bearing preform inner wall cylindrical by removing each of the wedge-shaped deformations by a machining operation;

c) removing the bearing preform from the fixture chamber; and d) relieving the bearing preform of elastic deformation to produce wedge-shaped fluid transfer recesses that extend between the leading edge of one gutter and the trailing edge of the next adjacent gutter.

2. The method of claim 1 wherein the machining operation of step b) is a grinding operation.

3. The method as claimed in claim 1 wherein the method is further comprised of the step of molding the bearing preform before step a).

4. The method as claimed in claim 1 wherein four wedge-shaped deformations are formed in step a).

5. The method as claimed in claim 1 wherein the fixture has at least one contact region that includes a narrow portion and a wide portion, the bearing preform supported solely by the contact region when the bearing preform is located in the fixture chamber, the method further comprising the step of forming at least one recess defined by the inner wall, outer bearing preform wall and the deforming members during step a).

6. The method as claimed in claim 5 wherein there are four support regions.

7. The method as claimed in claim 5 wherein the plurality of deforming members are comprised of transition surfaces.

8. The method as claimed in claim 1 wherein there are four gutters spaced equally around the inner wall of the bearing preform and the gutters are U-shaped.

9. The method as claimed in claim 1 wherein the bearing preform is made from a thermoplastic material.

10. The method as claimed in claim 1 wherein the bearing preform is made from a thermoset material.

11. The method as claimed in claim 1 wherein the deforming members are located adjacent the trailing gutter edges when the bearing preform is located in the fixture cavity.

12. The method as claimed in claim 1 wherein the wedge-shaped deformations are widest at the trailing gutter edge and are narrowest adjacent the leading edge of the gutter adjacent the gutter trailing edge.

* * * * *